United States Patent
Quintero Rangel et al.

(10) Patent No.: US 9,353,292 B2
(45) Date of Patent: May 31, 2016

(54) ASPHALT MODIFIED WITH AN SBS/MMWCNT NANOCOMPOSITE AND PRODUCTION METHOD THEREOF

(71) Applicant: CORASFALTOS—CORP. PARA LA INVESTIGACION Y DESARROLLO DE ASFALTOS EN EL SECTOR TRANSPORTE E INDUSTRIAL, Santander (CO)

(72) Inventors: Luz Stella Quintero Rangel, Santander (CO); Luis Enrique Sanabria Grajales, Santander (CO)

(73) Assignee: CORPORACION PARA LA INVESTIGACION Y DESARROLLO DE ASFALTOS EN EL SECTOR TRANSPORTE E INDUSTRIAL-CORASFALTOS, Piedecuesta, Santander (CO)

( * ) Notice: Subject to any disclaimer, the term of this patent is extended or adjusted under 35 U.S.C. 154(b) by 0 days.

(21) Appl. No.: 14/412,239

(22) PCT Filed: Aug. 21, 2013

(86) PCT No.: PCT/CO2013/000005
§ 371 (c)(1),
(2) Date: Dec. 31, 2014

(87) PCT Pub. No.: WO2014/029372
PCT Pub. Date: Feb. 27, 2014

(65) Prior Publication Data
US 2015/0184026 A1    Jul. 2, 2015

(30) Foreign Application Priority Data
Aug. 22, 2012    (CO) .................................. 12142253

(51) Int. Cl.
| | |
|---|---|
| C08J 3/22 | (2006.01) |
| C09D 7/12 | (2006.01) |
| C08L 53/02 | (2006.01) |
| C08L 95/00 | (2006.01) |
| C09D 195/00 | (2006.01) |
| C08J 3/00 | (2006.01) |
| C08K 3/04 | (2006.01) |

(52) U.S. Cl.
CPC ............... *C09D 195/00* (2013.01); *C08J 3/005* (2013.01); *C08J 3/226* (2013.01); *C08K 3/04* (2013.01); *C08L 53/02* (2013.01); *C08L 95/00* (2013.01); *C09D 7/125* (2013.01); *C09D 7/1291* (2013.01); *C08J 2395/00* (2013.01); *C08J 2453/02* (2013.01); *C08K 2201/011* (2013.01)

(58) Field of Classification Search
CPC ........ C08J 3/226; C08J 3/005; C08J 2395/00; C08J 2453/02; C09D 7/1291; C09D 7/125; C09D 195/00; C08L 53/02; C08L 95/00; C08K 3/04; C08K 2201/011
USPC .......................................................... 524/608
See application file for complete search history.

(56) References Cited

U.S. PATENT DOCUMENTS

| | | |
|---|---|---|
| 2002/0058740 A1 | 5/2002 | Lorah et al. |
| 2007/0213418 A1 | 9/2007 | Vermilion et al. |
| 2011/0201731 A1 | 8/2011 | Korzhenko et al. |

FOREIGN PATENT DOCUMENTS

| | | |
|---|---|---|
| CN | 101077935 | 11/2007 |
| EP | 1969066 | 2/2009 |

OTHER PUBLICATIONS

Su, Q., et al., Study on How to Improve Asphalt Modified . . . , Advanced Materials Research vols. 2012, vols. 430-432, pp. 217-220.
Lu, L., et al., Reinforcement of Styrene-Butadiene-Styrene Tri-Block Copolymer . . . , Carbon, 2007, vol. 45, pp. 2621-2627.
Das, A., et al., Modified and Unmodified Multiwalled Carbon Nanotubes in High Performance . . . , Polymer, 2008, vol. 49, pp. 5276-5283.
Wu, G., et al., Preparation and Properties of Hydroxylated . . . , Materials Science and Engineering A, vol. 527, pp. 5280-5286, 2010.
International Search Report issued in PCT Application No. PCT/CO2013/000005.
Written Opinion issued in PCT Application No. PCT/CO2013/000005.
Colombian Search Report issued in Colombian App. #121422533.
Response to Colombian Search Report dated Oct. 18, 2013.
Notice of Allowance issued in Colombian App. # 121422533.
IPRP issued in PCT/CO2013/000005.

*Primary Examiner* — Angela C Scott
(74) *Attorney, Agent, or Firm* — Lucas & Mercanti, LLP

(57) ABSTRACT

The invention relates to a method for modifying an asphalt binder using, as an additive, a nanocomposite of: functionalized multi-walled carbon nanotubes dispersed in a styrene-butadiene-styrene polymer matrix (SBS/MMWCNT). The asphalt modified with the SBS/MMWCNT nanocomposite has substantially improved mechanical resistance to deformations and to loads at high temperatures, such that the life of the flexible paving is improved. The asphalt mixtures produced with this novel modified asphalt binder have considerably less rutting, are classified as high-modulus asphalt mixtures when produced from asphalt of medium (60/70) or greater hardness, and are not sensitive to moisture effects.

14 Claims, 3 Drawing Sheets

ASPHALT MODIFIED WITH AN SBS/MMWCNT NANOCOMPOSITE AND PRODUCTION METHOD THEREOF

CROSS-REFERENCE TO RELATED APPLICATIONS

This application is a 371 of PCT/CO2013/000005 filed Aug. 21, 2013, which in turn claims the priority of CO 12142253 filed Aug. 22, 2012, the priority of both applications is hereby claimed and both applications are incorporated herein by reference.

TECHNICAL FIELD

The present invention relates to the field of industrial chemistry and persons responsible for road construction and the production of asphalt mixes. The application of the invention is in the production of a new polymer additive for modifying asphalt binders used in the production of asphalt mixes for the construction of roads with flexible pavings.

BACKGROUND OF THE INVENTION

An economic, social and environmental problem in the field of road construction is the deterioration of the pavings, caused mainly by ageing, the load frequency, the volume of traffic and environmental factors such as abrupt changes in temperature. Faced with this problem scientific advances have suggested modifying asphalts with polymers.

In 1930 investigations associated the hardening and the rigidity of the asphalt mix with the ageing of the asphalts; this would cause problems of permanent cracks and deformations in the paving. In order to alleviate these problems, the first modifications of asphalt were carried out in the 1960s in France, Germany and Italy. This modification was effected by incorporating a polymer into the asphalt in order to modify the mechanical strength of the latter. During the same period the first project for building roads using this technique was carried out in the United States; since then this technique has been used to impart stability to the asphalt and improve the mechanical strength of the asphalt mix used for the construction of pavings.

In 1961 Taxler concluded that the ageing of the asphalt mixes is due to the oxidation and weight loss of the asphalt in the asphalt mix during the mixing and compaction processes and service life as a paving.

Marzocchi et al. in 1981 patented the production of asphalt modified with rubber by chemical reaction of a bituminous material with a monoaromatic polymer, for use in glass fiber roofing and pavings.

Moran in 1991 patented a method for improving the stability of modified asphalts during storage; in this modification polymers treated with inorganic acids were used, and the product obtained was applied to asphalt carpets used for pavings, while in 1992 he patented the modification of asphalts using branched polymers treated with acids. The object of these inventions is to improve the stability of asphalts to changes in temperature during storage.

Zhang et al. in 2002 in their investigations modified asphalt using a styrene-butadiene-styrene polymer and addition of elemental sulfur as additive; the incorporation of SBS and sulfur to the asphalt reduces the fragility, improves the stability of the modified asphalt during storage, and increases the useful life of the paving.

Lan Lu et al. in 2007 in their investigations reinforced the styrene-butadiene-styrene polymer (SBS) with multi-walled carbon nanotubes (MWCNT) dissolved in tetrahydrofuran in order to obtain an SBS/MWCNT nanocomposite having a better mechanical strength than the conventional SBS polymer.

Saeed et al. and Shaopeng et al. in 2009 in their investigations studied the effects exerted by nanoclays on the rheological properties of the asphalt binder, and showed that this nanocompound improved the rigidity and the resistance to ageing of the asphalts.

Eidt, Jr. et al. patented in 1997 a nanocomposite containing concentrations between 0.1 wt. % and 15 wt. % of mineral clay (montmorillonite) in asphalt in order to improve the behavior of the lower rolling layer and absorb the noise produced by the traffic.

Mehta et al. in 2009 patented an asphalt nanocomposite with nanoparticles of clay material; this contains a mineral content between 1% and up to 15% of laminated clay material; this material is suitable for use as a covering material in roofings and other fixtures and fittings.

Guoliang Wu et al. in 2010 in their investigations prepared and studied the properties of a three-component hydroxylated styrene-butadiene-styrene co-polymer nanocomposite (HO-SBS) with multi-walled carbon nanotubes functionalized with acyl chloride (MWCNTs-COCl); their results showed that the new nanocomposite has a cross-linked structure and a good resistance to solvents.

Berzinis in 2011 patented a method for preparing a nanocomposite containing a styrene polymer, clay nanoparticles and an emulsifier; the material obtained improves the rigidity and the heat resistance of the polymer.

Zhanping et al. in 2011 in their investigations carried out the addition of nanoclays in asphalts, using percentages greater than 4%, and found that at this concentration the rutting and cracking of the mix is potentially reduced.

SUMMARY OF THE INVENTION

The object of modifying asphalt with polymers is to retard ageing, deformability and thermal susceptibility, as well as improve the mechanical strength so as to meet traffic demands, service quality and the useful life of a flexible paving.

The thermal susceptibility is a characteristic phenomenon of asphalt, which depends on changes in temperature. At ambient temperature its consistency is semisolid and it behaves like a thermoplastic material; at low temperatures and under the effect of rapid loads it becomes fragile and changes to a consistency of a brittle solid, producing transverse cracks and thermal cracking; on the other hand, at high temperatures and under sustained loads it behaves like a viscous liquid, which causes rutting in the asphalt mixes of the paving.

For their part, polymers are organic compounds of high molecular weight obtained from the combination of monomers by polymerization, this process forms a network-like structure that imparts mechanical strength and improves the performance of the latter. In these materials an increase in temperature causes them to soften, but on cooling they recover their solid state, which means that they behave like thermoplastics, thermoelastics or thermoelastoplastics; for example SBS and EVA are thermoelastoplastics.

The use of polymers to modify asphalts aims to improve the viscoelastic properties of the bitumen, such as the elasticity, flexibility, consistency and durability, in order to prevent deformations or cracks in the paving; also they mitigate the deficiencies exhibited by the asphalt as regards its mechanical properties. The choice of the polymer depends on the properties that are desired to be improved and on the behavior that is sought for the asphalt.

The polymeric modifiers used in asphalt materials are classified as follows:

Type I Polymer.

Improves the behavior of asphalt mixes at both high and low temperatures. This polymer is based on styrene blocks in two-block or three-block type radial elastomeric polymers, by means of configurations such as, inter alia, styrene-butadiene-styrene (SBS) or styrene-butadiene (SB).

Type II Polymer.

Improves the behavior of asphalt mixes at low temperatures. This polymer is based on linear elastomeric polymers, by means of a styrene rubber, butadiene-latex or neoprene-latex configuration. These polymers are used in pavings for cold and temperate climates, and also to prepare emulsions that are used in surface treatments.

Type III Polymer.

Improves the resistance of the asphalt mixes to rutting, reduces the temperature susceptibility of the asphalt cement, and improves its behavior at high temperatures. It is based on an elastomeric-type polymer, by means of configurations such as, inter alia, ethyl vinyl acetate (EVA) or high or low density polyethylene. They are used in hot climates, in asphalt mixes for structural courses of pavements with high traffic indices, as well as for preparing emulsions that are used in surface treatments.

The (styrene-butadiene-styrene) SBS and EVA (ethyl-vinyl acetate) polymers are the conventional materials most commonly used for modifying asphalts. Styrene-butadiene-styrene (SBS) at low and high temperatures optimizes the properties of the asphalt such as its penetration, softening point, thermal susceptibility, etc. Ethyl vinyl acetate (EVA) contains a carbonyl group in its structure and improves the rigidity and elasticity at high temperatures and high loads.

SBS and EVA are polymers that on account of their mechanical behavior are preferred for the modification of asphalts. Other less conventional polymers such as, inter alia, styrene butadiene rubber (SBR), polypropylene (PP), polystyrene, have the same object in the modification of asphalts, since at high temperatures they reduce the permanent deformation of the surface course of roads as a consequence of the frequency of the loads and abrupt climate changes.

In the field of the production of polymer nanocomposites, carbon nanotubes have attracted a great deal of interest on account of their unique structural and conduction properties, such as an excellent strength, modulus, electrical and thermal conductivities, and also their low density. Such compounds can impart exceptional mechanical properties and multifunctional characteristics, though if it is desired to use these materials as an effective reinforcement in composites, a suitable dispersion and a good interfacial linking between the carbon nanotubes and the matrix must be ensured. Accordingly, the degree of efficiency of the carbon nanotubes in improving the properties of the receptor medium is closely connected to the dispersion of said nanotubes. In fact, the homogenous dispersion of the nanotubes in the receptor medium, whether in the solid or liquid state, is one of the main challenges encountered as regards their applications. Carbon nanotubes are an agglomerated material that forms an interwoven cluster; therefore the functionalization of the carbon nanotubes is one of the ways used to improve the compatibility of the nanotubes and the receptor material. Similarly, the solubility of the carbon nanotubes in common solvents can be improved by the presence of functional groups on their surface; furthermore the chemically functionalized carbon nanotubes can produce strong interfacial bonds with many polymers, and besides can help to crosslink even further the polymeric structure due to the multiple linkages that are formed along their surface with the polymer matrix.

For its part, asphalt is composed of two fractions; one consisting of maltenes (viscous) that is composed by paraffins, resins and aromatic compounds, and the other a solid fraction containing the asphaltenes. This last plays an important role in the compatibility with polymers, since the lower the content of asphaltenes in the asphalts, the more similar it will be to the polymer when the network-type structure is formed in the asphalt. The modified asphalt has the ability to absorb stresses since it is more resistant to fractures and deformations, characteristics that produce physical defects such as cracking and rutting. These mechanical problems occur frequently, and furthermore are those that justify improving the mechanical properties of the asphalts.

The incorporation of a polymer in order to modify asphalt does not depend only on the chemical compatibility of the two, but it is also important to know the addition process of the polymer. The process takes place in two stages; in the first stage the polymer is dispersed in the asphalt without producing any effect on the properties; in the second stage the particles of the polymer absorb the maltenes and inflate them so as to disperse them, this being the stage in which the most significant rheological changes take place in the mix. It should be noted furthermore that some polymers can react with certain components of the asphalt.

The rheological properties of the modified asphalt depend on the composition and nature of the employed additives. These properties determine the mixing and compaction conditions in the preparation of the asphalt mix. An ideal mixing and compaction occurs when the modified asphalt behaves as an equi-viscous material at a specific temperature, which reduces the effect that the inflexibility of the binder can have on the volumetric properties of the mix during the hot mixing in situ.

Up to the present time, the investigations that have been carried out as regards the modification of asphalts demonstrate the use of additives such as rubber, polymers treated with acid, SBS polymers with sulfur, nanoclay-polymer composites or nanoclays as additives in order to improve the stability of the asphalt to changes in temperature during storage, reduce the fragility of the asphalt, increase the useful life of the paving, improve the rigidity, improve the resistance to ageing, absorb the noise in pavements, and potentially reduce the rutting and cracking of the mix. Up to now there has been no use of polymer nanocomposites based on carbon nanotubes applied to the modification of asphalts, nor has there been employed as an asphalt modifier an SBS polymer nanocomposite with functionalized multi-walled carbon nanotubes.

The object of the present invention is to prepare an SBS/MMWCNT polymer nanocomposite intended for use as a modifier for an asphalt, with the aim of providing the road-building sector with long-life asphalt pavings (based on high modulus asphalt mixes). In addition, the use of the present invention has a major impact on the road structure, which helps to satisfy effectively the requirements of modern society and, what is more, is a challenge for industrial and economic activities, to such an extent that it may be regarded as a new era of industrial revolution.

In the present invention an asphalt is modified with a styrene-butadiene-styrene (SBS) polymer nanocomposite with functionalized multi-walled carbon nanotubes (MMWCNT). The preparation and functionalization of an SBS polymer nanocomposite intended to be used as an asphalt modifier, the modification of the asphalt and the evaluation of some rheological properties of the modified asphalts provide information on the influence of the SBS/MMWCNT polymeric nanocomposite on said properties. The asphalt is modified with a polymer nanocomposite that enables an asphalt to be obtained that is capable of producing mixes of high modulus starting from a medium hardness bitumen, useful in the construction of long-life pavings.

In accordance with the present invention, the asphalt to be modified is treated as an asphalt base. To modify the asphalt base the polymer nanocomposite (SBS/MMWCNTs) is first of all obtained so that it can then be mixed with the asphalt base as follows:

1. In one embodiment of the invention the polymer nanocomposite is obtained from an SBS polymer in the form of pellets or crumbs, functionalized multi-walled carbon nanotubes (MMWCNTs) and one or more solvents.
2. The multi-walled carbon nanotubes should have a diameter between 5-50 nm and a length between 1-30 μm. The solvent used may be xylenes, toluene, acetone, tetrahydrofuran, chloroform, cyclohexane, ethanol, methanol, propanol, dimethylformamide, or a combination thereof. The multi-walled carbon nanotubes employed in the preparation of the nanocomposite (MMWCNT) may be functionalized with hydroxyl groups, MWCNT-OH, with carboxylic acid groups, MWCNT-COOH, with amino groups, MWCNT-amine, with phenol, MWCNT-phenol, or with alkyl groups.
3. The preparation of the SBS/MMWCNT nanocomposite additive is carried out by ultrasound and mechanical stirring ("solution casting" process). The MMWCNTs are first of all dispersed in a solvent by means of ultrasound and/or mechanical stirring, while the pellets/crumbs of SBS are dissolved in a solvent by mechanical stirring.
4. The solutions prepared from SBS and MMWCNT, according to stage 3, should be mixed by means of ultrasound and mechanical stirring. The solvent is evaporated from the homogenized solution by means of a rotary evaporator, a dryer, an evaporator, a vacuum distillation system or any other means that permits the evaporation of the solvent until the solution becomes viscous.
5. The homogenous viscous solution of SBS/MMWCNT from stage 4 is poured onto plates, metal strips or conveyor belts of glass or any material that is chemically stable to the employed solvent, and should be fed into a vacuum furnace or convection furnace at a temperature between 30° C. and 100° C. until the remaining solvent has evaporated and the films of the nanocomposite polymer are dry. The polymer films are then cut so as to obtain pieces with a maximum size between 0.2 cm and 4 cm.
6. The preparation of the conventional SBS additive is carried out starting from pellets/crumbs of the polymer, which are dissolved in a solvent so as to obtain a homogenous mixture, which is then introduced into a rotary evaporator, evaporator, dryer, vacuum distillation system or any other means that enables the solvent to be evaporated until the solution becomes viscous; in this way films of the pure SBS polymer are produced according to the procedure mentioned in stages 4 and 5.

After the preparation of the sheets of the SBS/MMWCNT additive, the asphalt is then modified. The samples of asphalt modified with SBS are prepared by means of mechanical stirring.

To initiate the modification process, the asphalt base is heated until it becomes fluid (150° C.±50° C.), in order to then add the pieces of polymer nanocomposite to the bitumen base. During the process mechanical stirring is maintained and the temperature is maintained for a period between 0.5 and 7 hours, until the homogeneity of the asphalt binder is ensured. The same process is applied in order to modify the asphalt base with a conventional SBS polymer. The concentrations of polymer in the asphalt base are 3, 5 and 7 wt. %.

DETAILED DESCRIPTION OF THE PREFERRED EMBODIMENTS

The present invention describes a method for preparing an SBS/MMWCNT polymeric nanocomposite (styrene-butadiene-styrene polymer/functionalized multi-walled carbon nanotubes) used to modify a medium penetration asphalt, and also describes the process for modifying the asphalt, which process does not require the use of machinery other than that used by the plants producing asphalt modified with polymer. The modification of asphalt with such a polymer nanocomposite enables an asphalt to be obtained that is suitable for producing high modulus mixes from a medium hardness bitumen, which also enables asphalt mixes to be produced that are not sensitive to moisture.

EXAMPLES

Example 1

A 60/70 asphalt was modified with an SBS/MMWCNT polymeric nanocomposite, in which the MMWCNTs were MWCNT-OH (multi-walled carbon nanotubes functionalized with hydroxyl groups), in accordance with the process disclosed in the present invention, and was characterized by means of viscosity, RTFOT ageing and "multiple stress creep and recovery" (MSCR) tests.

Example 2

The viscosity tests were carried out using an AR-2000ex dynamic shear rheometer provided with parallel plates of 25 mm diameter. The measurements were taken at temperatures of 60° C., 80° C. 100° C., 120° C. and 140° C. The results obtained are shown in FIG. 1.

Example 3

Figure 1:
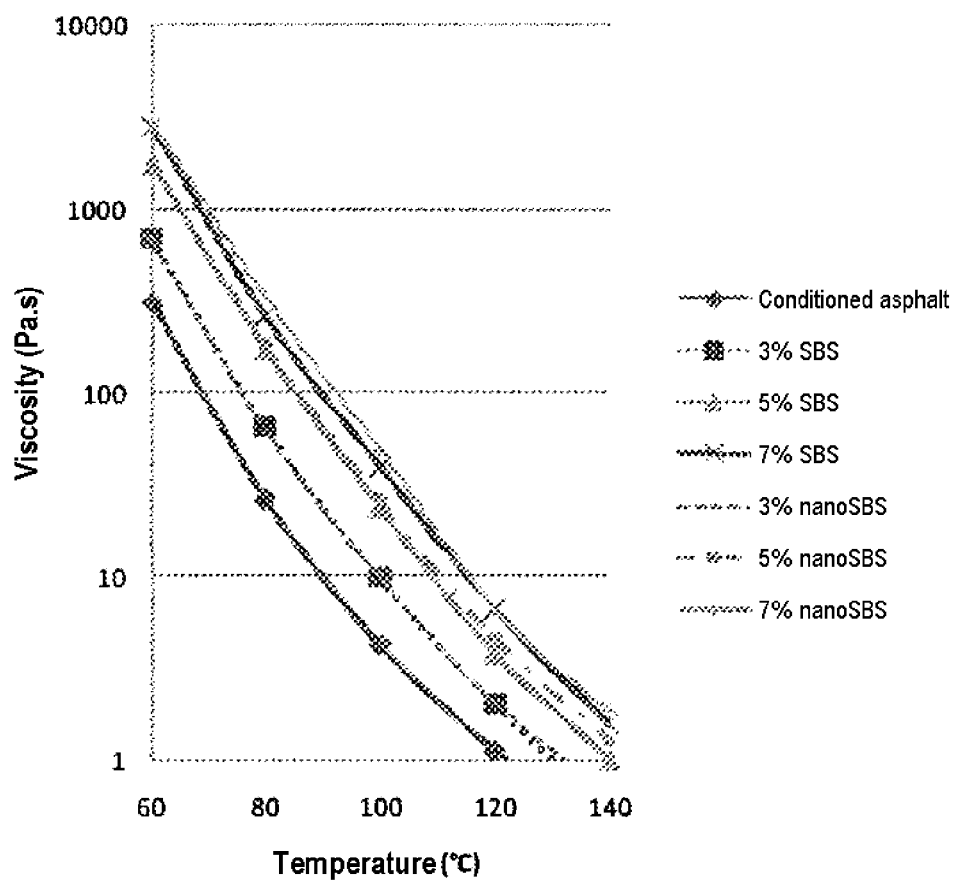
FIG. 1. Rheological curves of the conditioned asphalt and the modified asphalts.

The graphs of the rheological curves of the conditioned asphalt and the modified asphalts obtained from the viscosity measurements are shown in FIG. 1; these show that the viscosity of the modified asphalts was the same for each of the different concentrations, for the conventional polymer or the polymer nanocomposite.

Example 4

Figure 2:
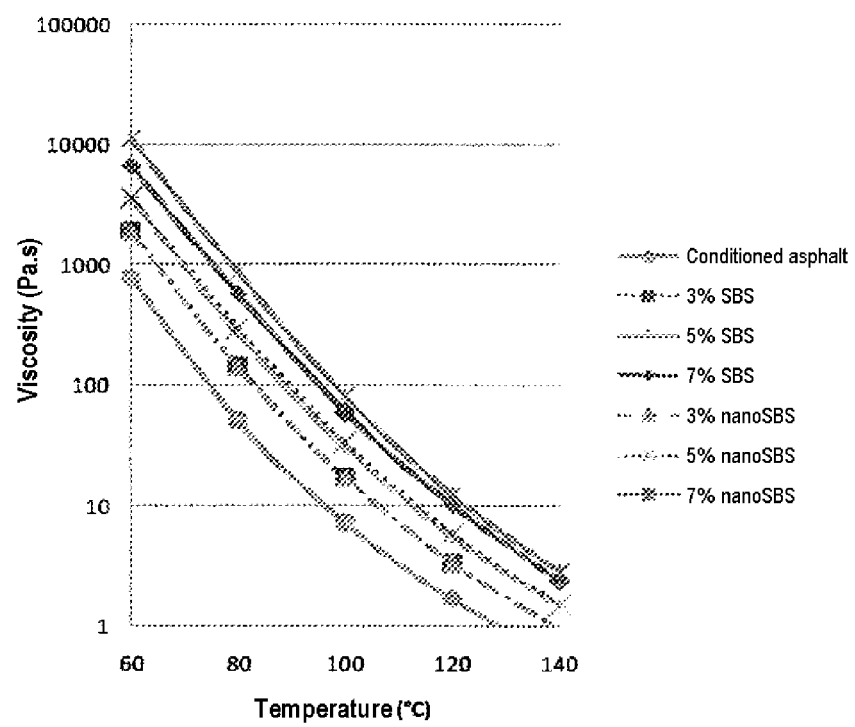
FIG. 2. Rheological curves of the conditioned asphalt and the modified asphalts, followed by RTFOT ageing.

The rheological curves shown in FIG. 2 illustrate the viscosity measurements performed on the conditioned asphalt and the modified asphalts after RTFOT ageing. In this case it can be seen that the asphalt sample modified with 7% of SBS/MWCNT-OH polymer nanocomposite behaves differently, exhibiting a larger increase in its viscosity compared to the change found with the asphalt sample modified with 7% of conventional SBS polymer. The asphalts modified with 3% of polymer and polymer nanocomposite exhibited approximately the same viscosity; with the asphalt binder modified with 5% of polymer nanocomposite a slight increase in its viscosity is observed compared to the binder modified with 5% of conventional polymer. This would indicate that during the RTFOT ageing process, which simulates the oxidation and conditioning that the asphalt binder undergoes during the preparation of the asphalt mix, a series of interactions of the polymeric nanocomposite could take place in the asphalt that reinforce the polymeric network structure, thereby reducing the thermal susceptibility of the binder when it is added at concentrations greater than 5 wt. %.

Example 5

Figure 3:
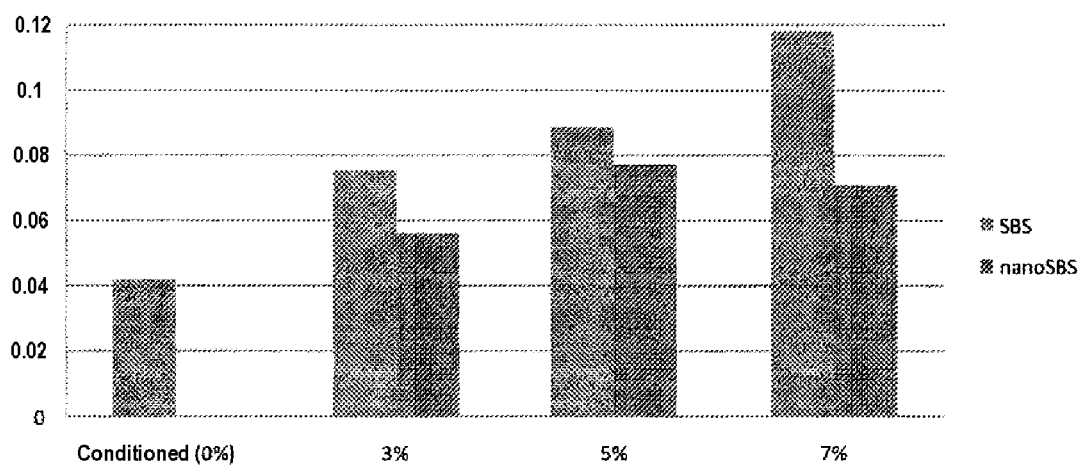
FIG. 3. Results of weight loss of the RTFOT ageing test for the modified asphalts.

The RTFOT ageing test is used to determine the degree of ageing and weight loss of the asphalt when subjected to a temperature of 163° C. in a rotary film for 85 minutes, which simulates the ageing that the binder experiences under the preparation conditions of the hot asphalt mix. FIG. 3 shows the results of this test.

Example 6

FIG. 3 shows the results of the RTFOT test. The weight loss in the RTFOT test was less for the conditioned asphalt and increased with the concentration of polymer in the binders, but was lower for all the bitumens modified with the polymer nanocomposite than with the pure polymer, the main difference being found with the asphalt modified with 7% of polymer nanocomposite, which exhibited around 40% less weight loss than the asphalt modified with 7% of conventional polymer. In this case it is found that at high temperatures the asphalt modified with SBS polymer nanocomposite exhibits the characteristics of a "nanofluid" on account of the fact that the carbon nanotubes have exceptional thermal diffusion properties, which means that an asphalt that contains a good dispersion of carbon nanotubes improves its properties, since they dissipate the heat better, more rapidly and more efficiently. Therefore an asphalt modified with SBS/MMWCNT polymer is less susceptible to thermal ageing.

Example 7

The multiple stress creep and recovery (MSCR) tests. Tables 1-4 show the results of the MSCR tests carried out on the modified asphalts aged by RTFOT and their classification in accordance with the specifications for the MSCR test.

Example 8

The MSCR tests showed that the non-recoverable deformation (non-recoverable compliance $J_{NR}$) decreases with the increase in the concentration of the conventional polymer and polymer nanocomposite, whereas the elastic recovery increases with the increase in the concentration of modifiers at all the investigated temperatures, and both properties have approximately the same value when the asphalt is modified with any of these materials at a concentration up to 5%. At a larger concentration of polymer nanocomposite or conventional polymer in the asphalt, the non-recoverable deformation $J_{NR}$ of the bitumen modified with the polymer nanocomposite is between 35-45% less than the $J_{NR}$ of the bitumen modified with the conventional polymer, the former being less deformable (more rigid); furthermore, the bitumen modified with 7% of polymer nanocomposite is not sensitive to loads at temperatures up to 82° C., whereas the bitumen modified with 7% of conventional polymer is sensitive to loads at temperatures of 76° C. and above. These results demonstrate a higher rigidity in the asphalt modified with 7% of SBS nanocomposite, despite its lower weight loss compared to the asphalt modified with conventional SBS.

Example 9

Table 5 shows the results of the accumulated deformation tests in asphalt mixes prepared with 60/70 asphalt, 60/70 asphalt modified with SBS, and 60/70 asphalt modified with SBS nanocomposite SBS/MWCNT-OH. The accumulated deformation for the asphalt mix prepared with the nanocomposite binder is more than 30% less than that found in the asphalt mix prepared with the binder modified with SBS, and more than 60% less than that found in the asphalt mix produced with the 60/70 asphalt.

Example 10

Table 6 shows the results of the dynamic modulus tests in asphalt mixes prepared with 60/70 asphalt, 60/70 asphalt modified with SBS and 60/70 asphalt modified with SBS nanocomposite SBS/MWCNT-OH. The average dynamic modulus for the asphalt mix prepared with the nanocomposite binder shows that this may be classified as a high modulus mix (>10 MPa), being more than 20% greater than the value found for the asphalt mix prepared with the binder modified with SBS and more than 50% greater than the value found for the asphalt mix produced with the 60/70 asphalt.

Example 11

Table 7 shows the results of the moisture susceptibility tests in asphalt mixes prepared with 60/70 asphalt, 60/70 asphalt modified with SBS and 60/70 asphalt modified with SBS nanocomposite SBS/MWCNT-OH. The results indicate that the asphalt mix prepared with the nanocomposite binder is not susceptible to deterioration due to moisture, just like the asphalt mix prepared with the binder modified with SBS, and therefore the nanomaterials present in the nanocomposite asphalt do not exert a negative effect at the asphalt/aggregated rock interphase.

TABLE 1

Specifications for carrying out the MSCR test at 64° C.

| Binder | $J_{NR}$ at 3.2 Kpa | Sensitivity to load $(J_{NR@0.1\ KPa} - J_{NR@3.2\ KPa})/ J_{NR@0.1\ KPa}$ | % Recovery @ 3.2 KPa, $\epsilon_r$ | Classification |
|---|---|---|---|---|
| Conditioned asphalt | 0.233 | 0.117 | 1.91 | Very high traffic |
| 3% SBS | 0.083 | 0.292 | 25.77 | Very high traffic |
| 5% SBS | 0.038 | 0.479 | 42.97 | Very high traffic |
| 7% SBS | 0.015 | 0.309 | 74.13 | Very high traffic |
| 3% SBS nanocomposite | 0.095 | 0.264 | 22.93 | Very high traffic |
| 5% SBS nanocomposite | 0.038 | 0.296 | 44.31 | Very high traffic |
| 7% SBS nanocomposite | 0.009 | 0.086 | 55.93 | Very high traffic |

TABLE 2

Specifications for carrying out the MSCR test at 70° C.

| Binder | $J_{NR}$ at 3.2 Kpa | Sensitivity to load $(J_{NR@0.1\,KPa} - J_{NR@3.2\,KPa})/J_{NR@0.1\,KPa}$ | % Recovery @ 3.2 KPa, $\epsilon_r$ | Classification |
|---|---|---|---|---|
| Conditioned asphalt | 0.579 | 0.128 | 0.56 | Very high traffic |
| 3% SBS | 0.208 | 0.360 | 21.26 | Very high traffic |
| 5% SBS | 0.093 | 0.318 | 32.71 | Very high traffic |
| 7% SBS | 0.038 | 0.632 | 64.24 | Very high traffic |
| 3% SBS nanocomposite | 0.236 | 0.404 | 17.67 | Very high traffic |
| 5% SBS nanocomposite | 0.096 | 0.533 | 36.62 | Very high traffic |
| 7% SBS Nanocomposite | 0.023 | 0.222 | 45.57 | Very high traffic |

TABLE 3

Specifications for carrying out the MSCR test at 76° C.

| Binder | $J_{NR}$ at 3.2 Kpa | Sensitivity to load $(J_{NR@0.1\,KPa} - J_{NR@3.2\,KPa})/J_{NR@0.1\,KPa}$ | % Recovery @ 3.2 KPa, $\epsilon_r$ | Classification |
|---|---|---|---|---|
| Conditioned asphalt | 1.266 | 0.122 | 0.40 | High traffic |
| 3% SBS | 0.513 | 0.580 | 14.48 | Very high traffic |
| 5% SBS | 0.257 | 0.631 | 22.18 | Very high traffic |
| 7% SBS | 0.094 | 1.411 | 56.29 | Very high traffic, sensitive to load |
| 3% SBS nanocomposite | 0.556 | 0.594 | 11.98 | Very high traffic |
| 5% SBS nanocomposite | 0.253 | 0.821 | 26.70 | Very high traffic, sensitive to load |
| 7% SBS nanocomposite | 0.063 | 0.367 | 32.34 | Very high traffic |

TABLE 4

Specifications for carrying out the MSCR test at 82° C.

| Binder | $J_{NR}$ at 3.2 Kpa | Sensitivity to load $(J_{NR@0.1\,KPa} - J_{NR@3.2\,KPa})/J_{NR@0.1\,KPa}$ | % Recovery @ 3.2 KPa, $\epsilon_r$ | Classification |
|---|---|---|---|---|
| Conditioned asphalt | 2.615 | 0.149 | 1.12 | Normal traffic |
| 3% SBS | 1.366 | 0.635 | 2.66 | High traffic |
| 5% SBS | 0.647 | 1.026 | 12.36 | Very high traffic, sensitive to load |
| 7% SBS | 0.316 | 3.173 | 42.13 | Very high traffic, sensitive to load |
| 3% SBS nanocomposite | 1.248 | 0.597 | 2.77 | High traffic |
| 5% SBS nanocomposite | 0.654 | 1.213 | 13.29 | Very high traffic, sensitive to load |
| 7% SBS nanocomposite | 0.174 | 0.601 | 19.25 | Very high traffic |

TABLE 5

Accumulated deformation of the evaluated asphalt mixes*

| BINDER | % DEFORMATION |
|---|---|
| 60/70 asphalt | 0.7314 |
| 60/70 asphalt modified with SBS | 0.4143 |
| 60/70 asphalt modified with SBS nanocomposite | 0.2831 |

*Test conditions: applied force 100 KPa, 3600 load cycles at 40° C.

TABLE 6

Dynamic modulus values of the evaluated asphalt mixes*

| BINDER | DYNAMIC MODULUS, MPa |
|---|---|
| 60/70 asphalt | 6784 |
| 60/70 asphalt modified with SBS | 8488 |
| 60/70 asphalt modified with SBS nanocomposite | 10467 |

*Test temperature: 20° C.

TABLE 7

Sensitivity of the evaluated asphalt mixes to moisture

| BINDER | TSR VALUE, % |
|---|---|
| 60/70 asphalt | 63 |
| 60/70 asphalt modified with SBS | 98 |
| 60/70 asphalt modified with SBS nanocomposite | 97 |

The invention claimed is:

1. A method for preparing asphalt modified with a polymer nanocomposite additive comprising styrene-butadiene-styrene and multi-walled carbon nanotubes comprising:
   1) preparing a polymer nanocomposite additive comprising:
      a) dispersing a multi-walled carbon nanotubes in a solvent by ultrasound and/or mechanical stirring in order to obtain a multi-walled carbon nanotubes dispersion;
      b) dissolving a styrene-butadiene-styrene polymer in a solvent by mechanical stirring in order to obtain a styrene-butadiene-styrene solution;
      c) mixing the multi-walled carbon nanotubes dispersion with the styrene-butadiene-styrene solution by ultrasound and/or mechanical stirring and obtaining a homogeneous viscous solution of styrene-butadiene-styrene polymer and multi-walled carbon nanotubes;
   2) introducing the polymer nanocomposite additive to an asphalt base and mixing the polymer nanocomposite additive with the asphalt base in order to form the asphalt modified with the polymer nanocomposite comprising styrene-butadiene-styrene and multi-walled carbon nanotubes.

2. The method for preparing asphalt modified with a polymer nanocomposite additive comprising styrene-butadiene-styrene and multi-walled carbon nanotubes of claim 1, wherein in the preparation stage of the polymer nanocomposite, the styrene-butadiene-styrene polymer is in the form of pellets or crumbs, and the multi-walled carbon nanotubes are functionalized.

3. The method for preparing asphalt modified with a polymer nanocomposite additive comprising styrene-butadiene-styrene and multi-walled carbon nanotubes of claim 2, wherein the multi-walled carbon nanotubes are functionalized with functional groups selected from the group consisting of hydroxyl groups, carboxylic acid groups, amino groups, phenol, and alkyl groups.

4. The method for preparing asphalt modified with a polymer nanocomposite additive comprising styrene-butadiene-styrene and multi-walled carbon nanotubes of claim 2, wherein the functionalized multi-walled carbon nanotubes are dispersed in the solvent by application of ultrasound for a period not greater than 24 hours.

5. The method for preparing asphalt modified with a polymer nanocomposite additive comprising styrene-butadiene-styrene and multi-walled carbon nanotubes of claim 1, wherein the solvent is selected from the group consisting of xylenes, toluene, acetone, tetrahydrofuran, chloroform, cyclohexane, ethanol, methanol, propanol, dimethylformamide, and combinations thereof, with a solvent/polymer weight ratio between 1 and 20 and with a solvent/multi-walled carbon nanotubes weight ratio between 10 and 10,000.

6. The method for preparing asphalt modified with a polymer nanocomposite additive comprising styrene-butadiene-styrene and multi-walled carbon nanotubes of claim 1, wherein the multi-walled carbon nanotubes have a diameter between 5-50 nm and a length between 1-30 μm.

7. The method for preparing asphalt modified a polymer nanocomposite additive comprising styrene-butadiene-styrene and multi-walled carbon nanotubes of claim 1, wherein the styrene-butadiene-styrene polymer solution and the multi-walled carbon nanotubes dispersion are mixed and homogenized for a period not greater than 4 hours.

8. The method for preparing asphalt modified with a polymer nanocomposite additive comprising styrene-butadiene-styrene and multi-walled carbon nanotubes of claim 1, wherein the solutions prepared from styrene-butadiene-styrene and multi-walled carbon nanotubes are mixed by means of ultrasound and mechanical stirring until they are homogenized.

9. The method for preparing asphalt modified with a polymer nanocomposite additive comprising styrene-butadiene-styrene and multi-walled carbon nanotubes of as claimed in claim 1, wherein the solvent is evaporated from the homogenized solution by means of a rotary evaporator, a dryer, an evaporator, a vacuum distillation system or any other means that allows the evaporation of the solvent until the solution becomes viscous.

10. The method for preparing asphalt modified with a polymer nanocomposite additive comprising styrene-butadiene-styrene and multi-walled carbon nanotubes as claimed in claim 1, wherein the homogeneous viscous solution of styrene-butadiene-styrene and multi-walled carbon nanotubes is poured onto plates, metal strips or conveyor belts of glass or any material that is chemically stable with respect to the employed solvent, and the latter are fed into a vacuum furnace or convection furnace at a temperature between 30° C.-100° C. so as to evaporate the remaining solvent and produce the dry sheets of the polymer nanocomposite additive comprising styrene-butadiene-styrene and multi-walled carbon nanotubes.

11. The method for preparing asphalt modified with a polymer nanocomposite additive comprising styrene-butadiene-styrene and multi-walled carbon nanotubes as claimed in claim 10, wherein the sheets of the Polymer nanocomposite are cut to pieces having a maximum size of 0.2 cm-4 cm.

12. The method for preparing asphalt modified with a polymer nanocomposite additive comprising styrene-butadiene-styrene and multi-walled carbon nanotubes nanocomposite as claimed in claim 11, wherein the asphalt base is heated at a temperature between 100° C. and 200° C. until it becomes fluid, following which the pieces of polymer nanocomposite are added.

13. The method for preparing asphalt modified with a polymer nanocomposite additive comprising styrene-butadiene-styrene and multi-walled carbon nanotubes as claimed in claim 1, wherein the mix of asphalt base and the polymer nanocomposite additive is homogenized by mechanical stirring for a period between 0.5 and 7 hours.

14. The method for preparing asphalt modified with a polymer nanocomposite additive comprising styrene-butadiene-styrene and multi-walled carbon nanotubes as claimed in claim 13, wherein the concentration of the polymer nanocomposite additive in the asphalt base is between 3-7%.

* * * * *